June 19, 1956
A. COLONNA
2,750,599
BUILT-IN FOLD-AWAY WATER CLOSET
Filed Dec. 21, 1953
5 Sheets-Sheet 1
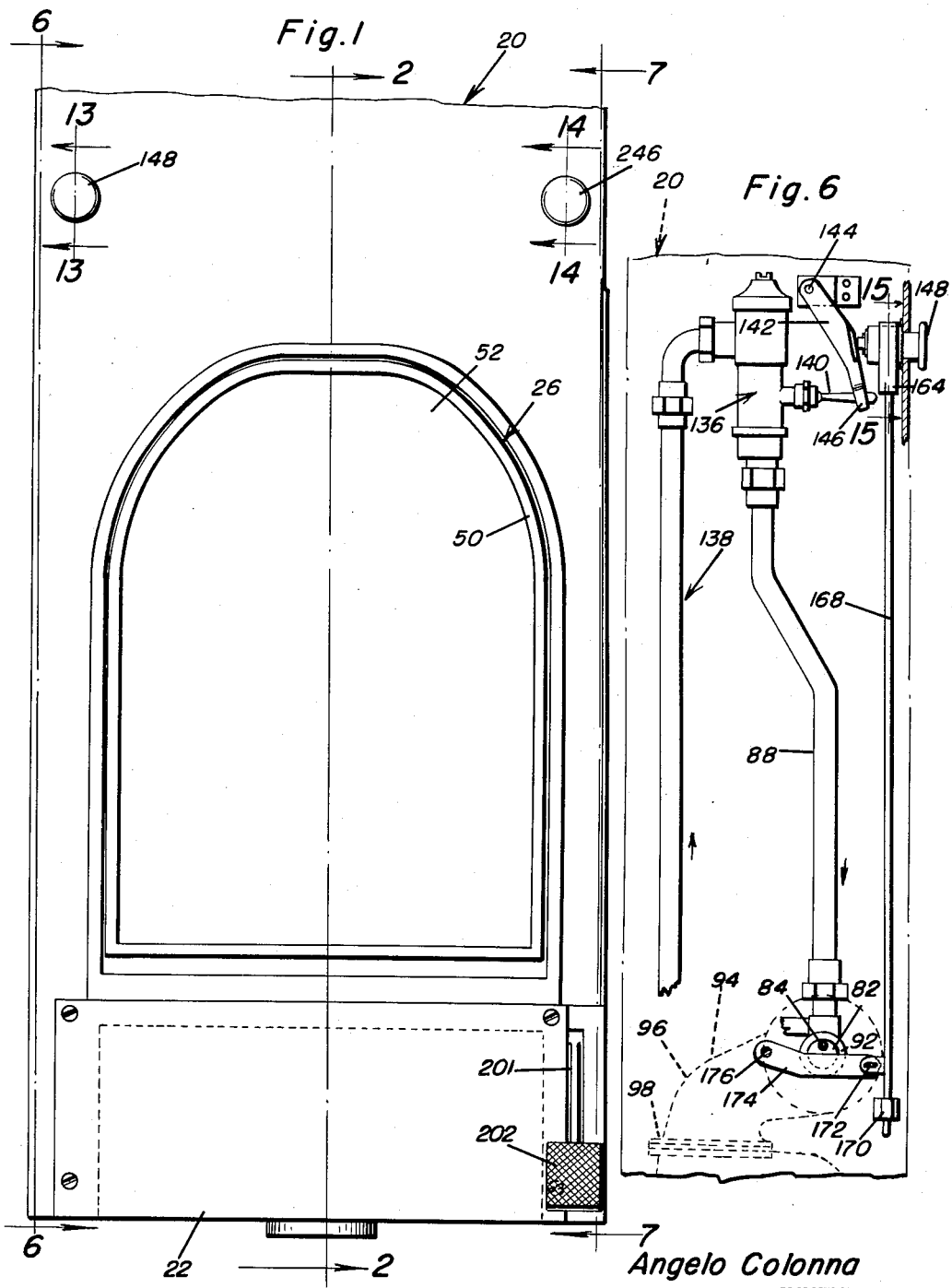
Angelo Colonna
INVENTOR.

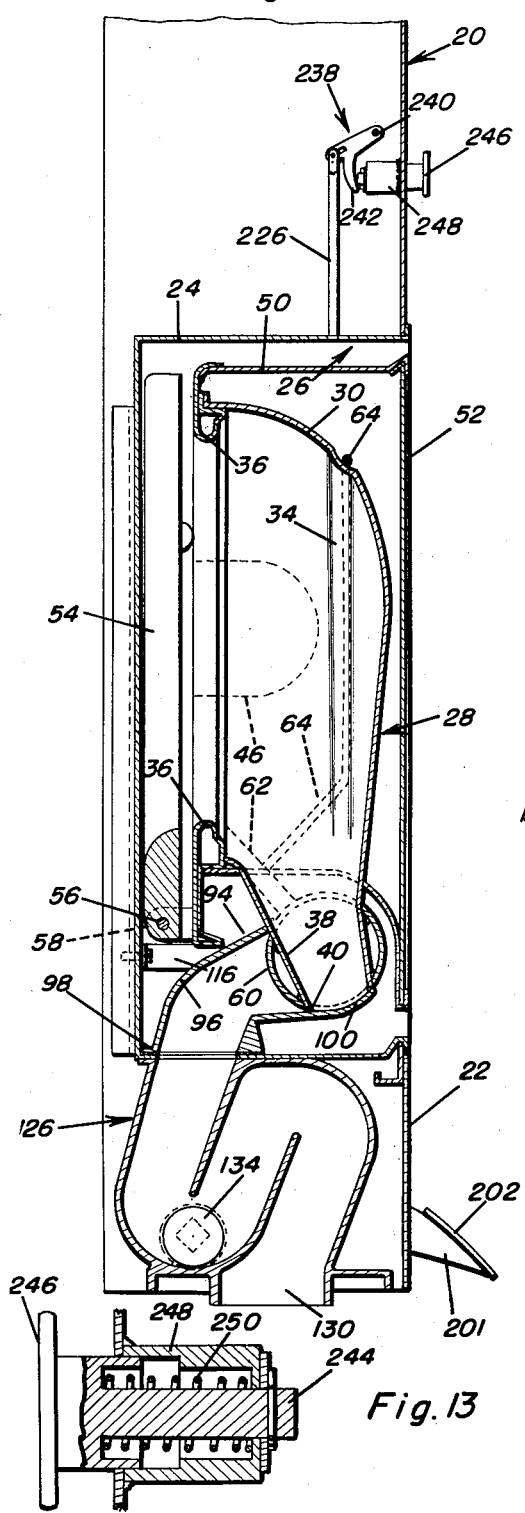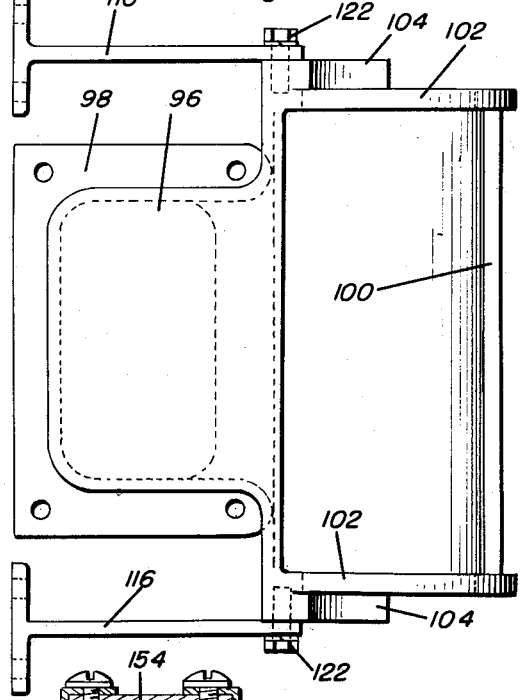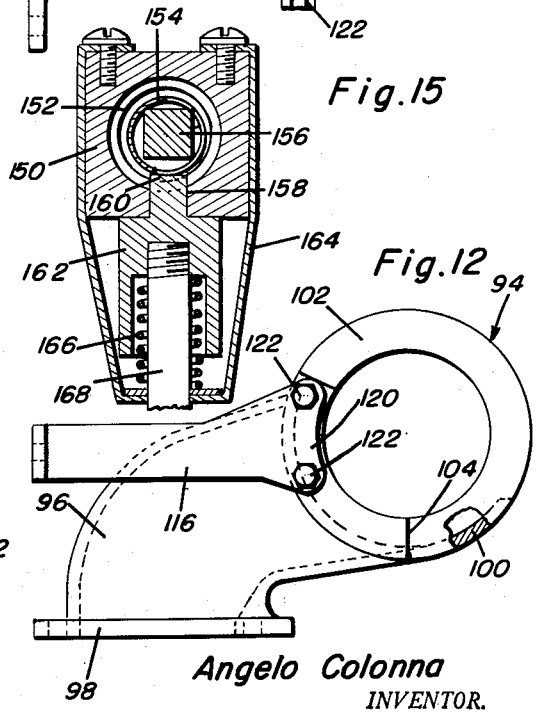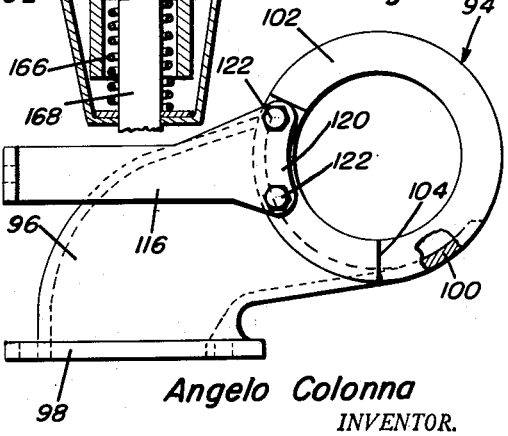
Angelo Colonna
INVENTOR.

June 19, 1956     A. COLONNA     2,750,599
BUILT-IN FOLD-AWAY WATER CLOSET
Filed Dec. 21, 1953     5 Sheets-Sheet 3
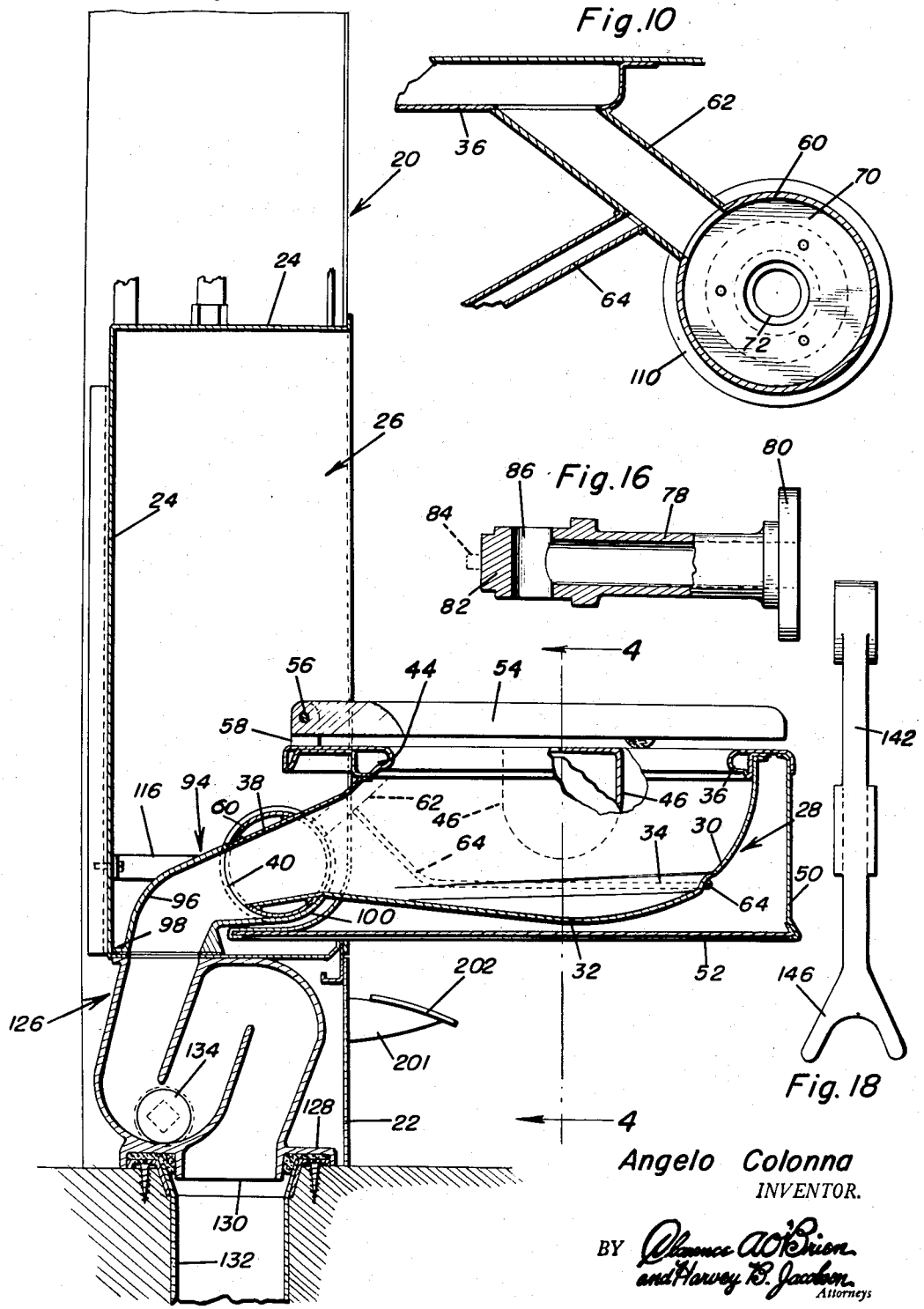
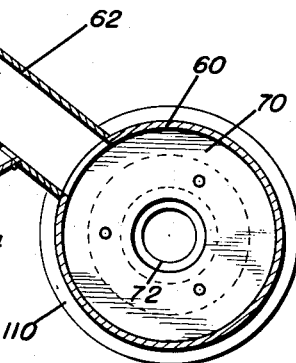
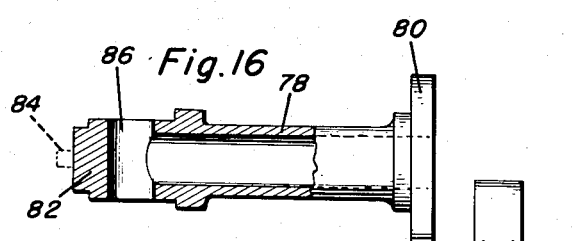
Angelo Colonna
INVENTOR.

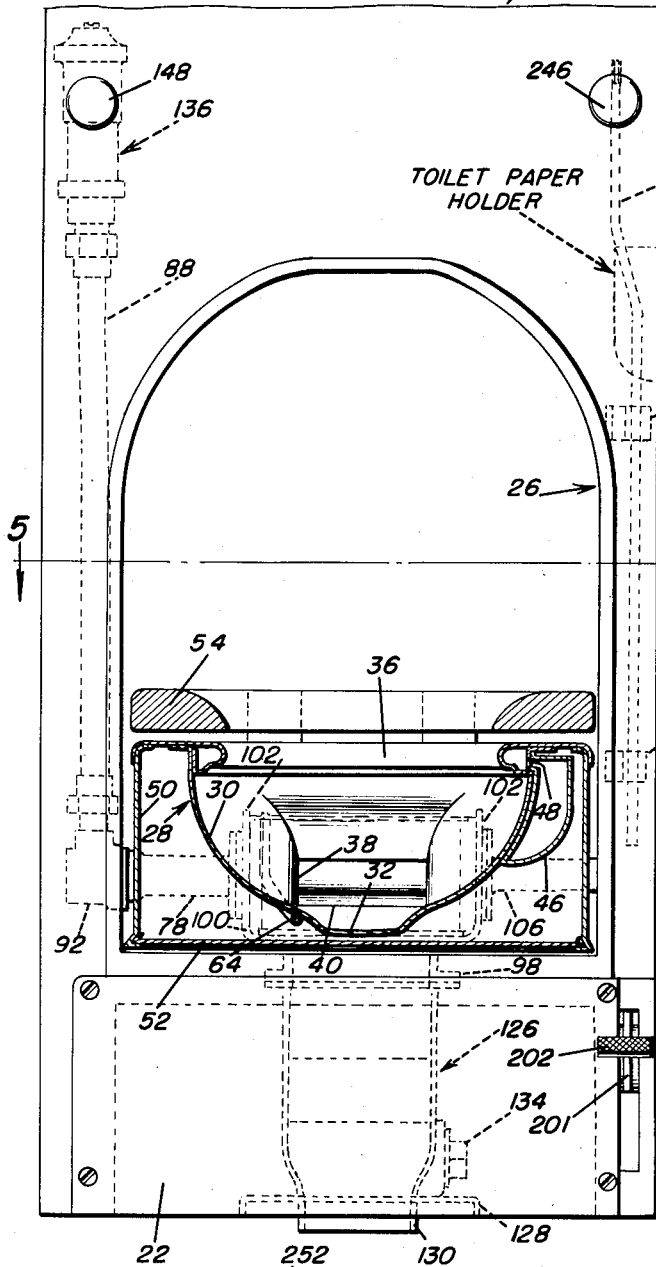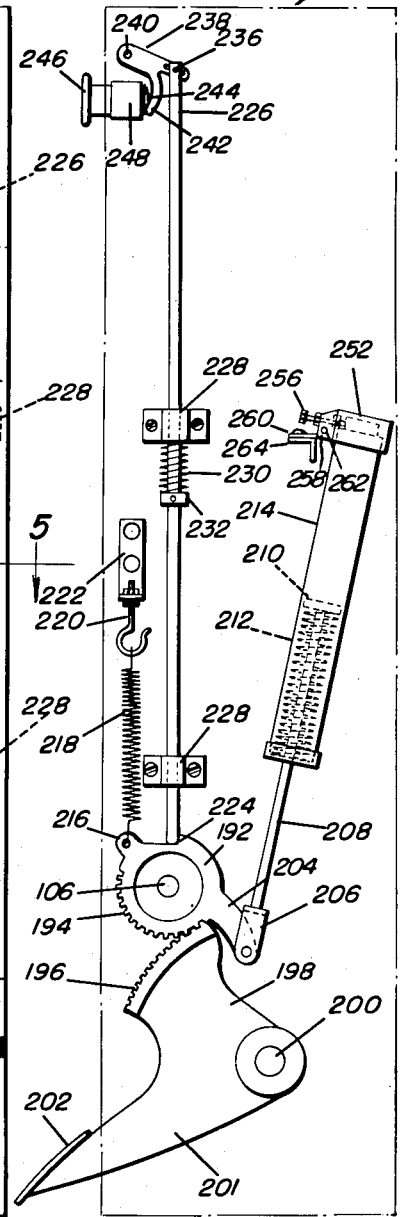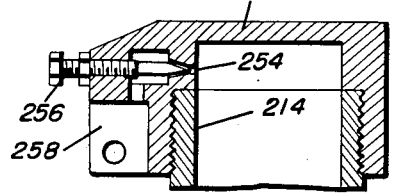

June 19, 1956     A. COLONNA     2,750,599
BUILT-IN FOLD-AWAY WATER CLOSET
Filed Dec. 21, 1953     5 Sheets-Sheet 5
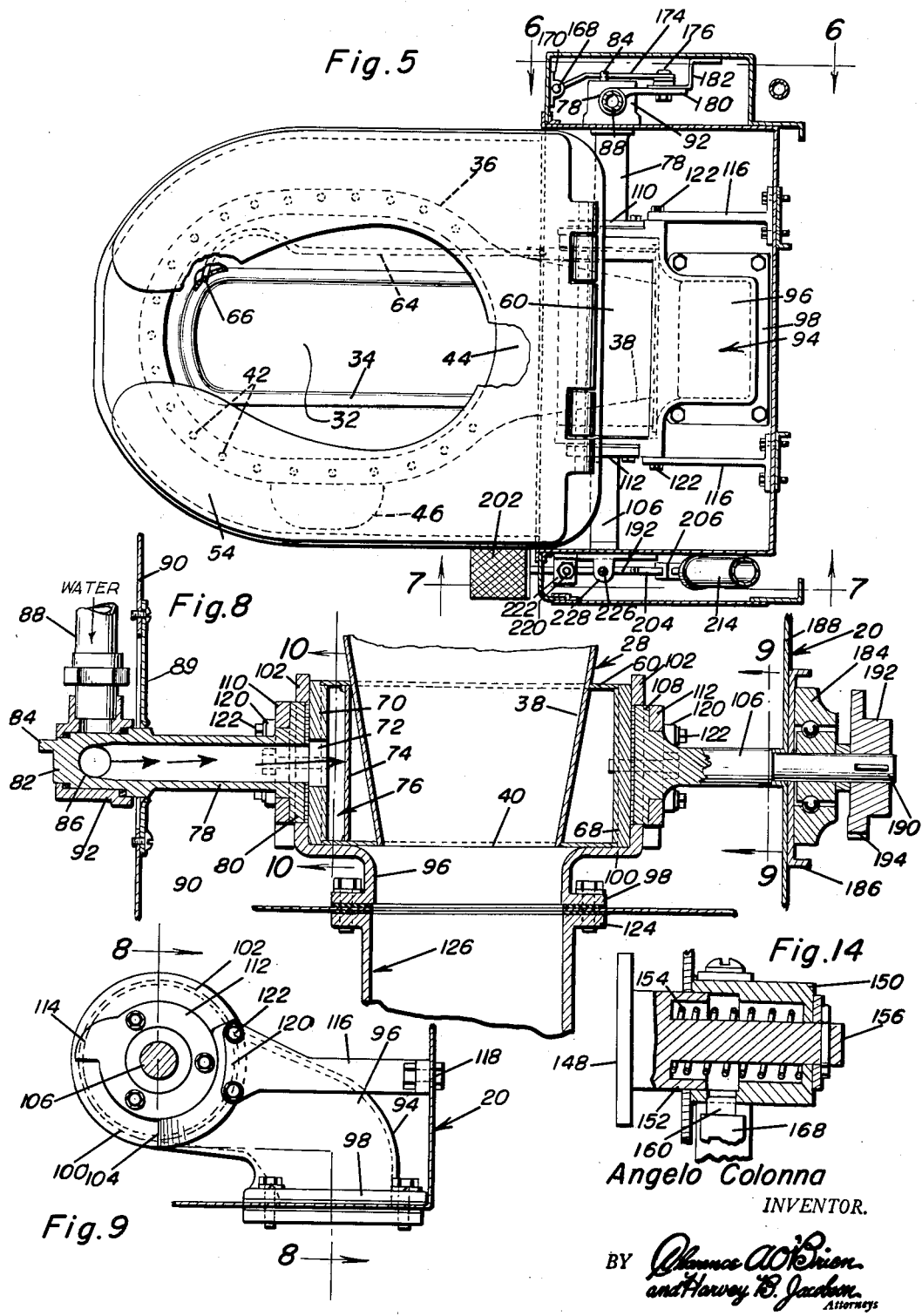
Angelo Colonna
INVENTOR.

United States Patent Office 2,750,599
Patented June 19, 1956

2,750,599

BUILT-IN FOLD-AWAY WATER CLOSET

Angelo Colonna, Philadelphia, Pa.

Application December 21, 1953, Serial No. 399,345

16 Claims. (Cl. 4—10)

The present invention relates to certain new and useful improvements in a fold-away water closet which is characterized, generally speaking, by a built-in cabinet having a suitably designed alcove or compartment into which a hide-away water closet bowl is folded and compactly stored when not in use and which is equipped with complemental special appurtenances systematically arranged for selective use, the complete construction being expressly, but not necessarily, adapted for use in Pullman cars, airplanes and the like, where, as a general rule, the available space for a flush-type water closet or toilet is limited and must, therefore, be economically reckoned with and effectively conserved.

In carrying out the preferred embodiment of the overall invention, the usual stationary soil or disposal pipe is provided at its inlet end with an appropriate S-trap and the latter, in turn, is provided on its upper or intake end with a specially designed elbow-like fitting communicatively joined with said inlet end. This fitting is specially constructed to provide an adapter head having bearing means for a complemental cylinder, the cylinder being oscillatable therein. Flush water is fed and by-passed under pressure through an end portion of the cylinder and then through an appropriate duct or connection to an apertured distributing or flush ring or rim on the foldway bowl. The bowl is provided at its discharge end with effluent neck which, when the bowl is "down" and duly flushed, serves to deliver the fecal matter and liquid progressively into the elbow-like fitting and the associated S-shaped trap. The cylinder and discharge neck are united in such a way that when the bowl is "down" in its usable position, said neck is in emptying communication with the trap. When, however, the bowl is in its "up" out-of-use position in the storing compartment, the discharge neck is substantially closed off and is out of communication with the trap.

More specifically, and somewhat briefly summarized, the invention, therefore, has to do with a folding toilet, a cabinet having an accommodation storing compartment, a toilet bowl normally in a folded out-of-the-way "up" position in said compartment, a stationary soil pipe provided at its inlet end with an S-trap, an elbow-like fitting communicatively joined to the intake end of said S-trap and having a stationary cylinder-seating and cradling adapter, the latter provided with integral ring-like portions at its ends functioning as bearings, an oscillatable cylinder confined in said cradling adapter and rockable between said bearings, means journalling the respective end portions of the cylinder in said bearings, said cylinder providing a flush water receiver, said bowl having an apertured flush ring, a short water delivery pipe or duct communicatively connecting said receiver with said flush ring, said bowl also having a fecal matter emptying neck joined to and operable in unison with said cylinder, said neck being in bowl-scavenging registry with said fitting when the bowl is in its "down" position and blocked off and substantially out of registration with the fitting when the bowl is in its "up" position.

Another object of the invention has to do with the structure briefly set forth above and the combination therewith of a horizontal rocker shaft which is fixed to and extends axially beyond one end of the oscillatory cylinder and which, being thus fixed, rotates or oscillates in conjunction with the cylinder. Manually actuable means is operatively connected to the outer end of the rocker shaft and this serves to rotate the latter shaft and cylinder in unison in a manner to mechanically swing and lift the bowl from its "down" to its "up" position so that it is not necessary for the user to actually touch the bowl after it has served its intended purposes. The same shaft and complemental means which serves to lift and store the bowl away is also constructed in a manner to aptly release and automatically move and lower the bowl from its stored position, whereby it is allowed to swing gradually down to its usable position.

Concerning the latter feature, novelty is predicated on the stated means which is unique in that it is characterized by a pivotally mounted foot treadle, a gear fixed on the outer end of the rocker shaft, said foot treadle having a cooperating gear segment meshing with said gear so that by simply stepping on the then raised treadle, after the bowl has been used, the latter is mechanically and somewhat automatically swung up into its out-of-the-way position in the aforementioned cabinet compartment.

Another and highly important object of the invention has to do with the special hinged connection which is provided between the discharge neck on the bowl, the complemental cylinder and adapter fixture or fitting and especially wherein the cylinder has a water receiving chamber at one end, and wherein water is delivered from a valve controlled source to said chamber by way of a feed pipe, and by-passed through and then from the receiving chamber to the apertured distributing ring on the bowl with a major portion or amount of the delivered water going directly into the ring and flushing the bowl, a portion going into an auxiliary water swirling pipe for assisting in the bowl flushing operation and a very limited portion or amount entering a reservoir, which is incorporated in the bowl construction, the water which is collected in said reservoir being retained therein while the bowl is in use and later dumping into an imperforate rear end portion of said flush rim when the bowl is swung up to its out-of-the-way position so that when said bowl is next swung down for use, said thus trapped reservoir water is again dumped back into the perforated portion of the flush rim and aptly spilled into the bowl to form a limited pool of water thought to be necessary in rendering the operation more sanitary and complete before the bowl is used and flushed.

Then, too, novelty is predicated on the structural means heretofore briefly recited and the combination therewith of a horizontal rotary flush water feed pipe fixed to, axially aligned and communicatively connected with one end of said cylinder, a vertical flush water delivery pipe, an "off" and "on" normally closed bowl feeding or inlet valve affording an operating flow connection between adjacent cooperating ends of said horizontal and vertical pipes, a source of water supply embodying a manually tripped flushing valve joined to said vertical supply pipe, said inlet and cut-off valve being closed when the bowl is "up" and out of use and open when the bowl is "down" and in use.

What is more, novelty is predicated on a push-button having complementary fool-proofing safety means for intentionally latching and releasing the flush valve, said means characterized by a vertically disposed reciprocable latch rod having a detent normally engaging the push-button and preventing operation of the same so long as the bowl is "up," and novel operating means between said rotary inlet pipe and latch rod which means comes satisfactorily into play when the bowl is down, that is, causes the latch rod to be pulled down to release the detent so that the push-button is then freely actuatable, but only so long as the bowl is in its "down" usable position.

Numerous other objects, features and specific structural and functional advantages will become clear upon considering the drawings in conjunction with the specification and the subjoined claims.

In the drawings:

Figure 1 is a fragmentary elevational front view showing a fold-away toilet constructed in accordance with the principles of the present invention, and illustrating the position of the parts when the bowl is in its "up" out-of-the-way or folded position;

Figure 2 is a central vertical section taken approximately on the plane of the line 2—2 of Figure 1, looking in the direction of the arrows;

Figure 3 is a view similar to Figure 2 in section and elevation and showing the bowl in its "down" or usable position;

Figure 4 is a view taken on the approximate line 4—4 of Figure 3;

Figure 5 is a section on the line 5—5 of Figure 4, looking in the direction of the arrows;

Figure 6 is a section taken on the line 6—6 of Figures 1 and 5, respectively;

Figure 7 is a section taken on the line 7—7 of Figures 1 and 5, respectively;

Figure 8 is a view in section and elevation taken on the plane of the irregular line 8—8 of Figure 9, looking in the direction of the arrows;

Figure 9 is a section on the line 9—9 of Figure 8;

Figure 10 is a section on the line 10—10 of Figure 8, looking in the direction of the arrows;

Figure 11 is a detail plan view of the aforementioned elbow fitting with the complemental cylinder and associated parts omitted;

Figure 12 is an end view, with a portion in section, of the elbow fitting seen in Figure 11;

Figure 13 is a detail section on an enlarged scale on the vertical line 13—13 of Figure 1 looking in the direction of the arrows;

Figure 14 is a similar detail section on an enlarged scale taken on the line 14—14 of Figure 1 looking in the direction of the arrows;

Figure 15 is likewise an enlarged sectional and elevational view taken on the line 15—15 of Figure 6, looking in the direction of the arrows;

Figure 16 is a detail view, partly in section and partly in elevation, of a horizontal water inlet pipe or tube registering with the inlet to the bowl and whose left-hand end (in the drawings) functions as a part of an "off" and "on" valve, whereby the water is let into the bowl when the bowl is down and is cut off from the bowl when the bowl is up.

Figure 17 is an enlarged fragmentary sectional and elevational view of the upper valved end of the air cylinder shown at the right in Figure 7;

Figure 18 is an enlarged detail elevational view of the pivoted lever existing between the handle of the flush valve and the associated push-button seen in Figure 6.

By way of introduction to the following detailed description, it is to be pointed out that the subject matter of the instant application has to do with certain new and useful improvements which are in relation to and a specific extension of similar subject matter disclosed in my copending application on a folding water closet identified as Serial No. 317,748, filed October 30, 1952. In fact, there are certain common subjects-matter coexisting in both applications which is generically treated as having to do with the structural combination characterized by a stationary waste or disposal conduit, a bowl having a flush water rim and a funneling and discharge neck, a hollow bowl hinging head or cylinder having a space therein for receiving as well as by-passing flush water which is under pressure, a by-passing and delivery tube communicatively connecting the cylinder or head with the rim, said neck being integrated with and passing crosswise or diametrically through the cylinder or head between the respective ends of the latter. The effluent end of the neck is constantly open and no portion of this neck actually communicates with the water by-passing space in the stated head. An elbow-like fitting, with or without a trap, has communicating connection with the waste conduit and the head means, the latter provided with spaced auxiliary aligned bearings and said hinging head having its end portions journaled for oscillation in said bearings.

The toilet construction, the essential phase of the invention, is actually used in a built-in cabinet which also includes a fold-away wash basin which is not herein disclosed. The cabinet may be of any suitable construction and all of the details thereof are not particularized here. Therefore, the cabinet is referred to in a broad structural sense by the numeral 20 and it is of suitable hollow rectangular form appropriately built into a wall or similar structure. Insofar as the subject matter of the instant invention is concerned, there is a suitable cover plate detachably mounted on the front at the bottom as shown in Figure 4 at 22. An appropriate arrangement of walls 24—24 suitably bent serves to define what is here referred to as an alcove or compartment 26 (see Fig. 3) for the fold-way toilet means. The latter is characterized, as generally well shown in Figures 3 and 4, for example, by a suitably shaped bowl 28 having a bowl proper 30 with a suitable bottom 32 and a channel-like indentation 34. The upper portion of the bowl is provided with an endless water circulating, distributing and flush rim or ring 36. The aforementioned funnel-shaped discharge neck, at the left, in Figure 3, for example, is denoted by the numeral 38 and this is open at the discharge end 40. The forward major portion of the rim is provided with a multiplicity of discharge ports or orifice 42 (Fig. 5) for flushing the water into the bowl and the rear portion 44 is imperforate for trapping subsequently usable water from a reservoir 46 (see Figure 4) which is supported on the exterior at the right-hand side of the bowl and has communication, at a suitable level, as at 48, with the flush rim. There is a pan-like housing or casing for this bowl, the main rim or wall of which is denoted at 50 in Figure 4 and the bottom at 52. This housing sufficiently encases the bowl to facilitate convenient and practical folding into the compartment or alcove 26 and the plate or bottom 52 then serves as a closing door or panel, as is clear in Figure 1. An appropriate seat 54 is provided which is hinged as at 56 on suitably supported perch members 58.

The bowl receives its supply of flush water from a hinging head or cylinder which is denoted by the numeral 60 (see Fig. 10) by way of a by-passing tube 62 which communicates with the flush rim 36 in the manner here shown. There is also an auxiliary water swirling tube at 64 which communicatively leads from 62 and partially embraces the bowl by following the impression 34 and communicatively connects at its discharge end, as at 66 (see Fig. 5), with what may be called the forward or outer portion of the bowl. With further reference to the hinging head or cylinder and particularly in reference to Figure 8, it will be seen that said cylinder has appropriate closing heads 68 and 70 at the respective ends, with the head 70 having a central or axial water inlet hole at 72, adjacent to which is an internal partition or wall 74 defining a limited water receiving space 76. While considering this phase of a construction, it is thought advisable to touch upon the water inlet "shaft" or tube which is horizontally disposed and here denoted by the numeral 78, and which has a head flange 80, said pipe communicating with the inlet hole 72. The outer end portion of this shaft, as also shown at the left in Figure 8, is solid or closed as at 82 where it is provided with an eccentrically disposed outstanding trip lug 84 which serves in a manner to be hereinafter described. This end portion 82 serves as a valve element and has ports 86 registerable with a a vertical water delivery pipe 88. The shaft 78 extends through an adapter 89 in the wall 90 (Fig. 8) in the casing or cabinet construction and the projecting valved end is rotatable in a fitting 92 fixed on the lower end of the pipe 88, suitable packing means being provided so that the features comprising the fitting 92 and closed end 82 of the pipe provide a cut-off valve. This valve is normally open when the bowl is down and in use and it is closed when the bowl is in its folded away "up" or stored position.

Before continuing with the means whereby the flush water is supplied to the receiving space 76 in the cylinder or head 60, it is convenient to mention now the manner in which this head is hingedly mounted. A suitable elbow-like fitting or cast unit is provided as the adapter means and this is denoted, generally speaking, by the numeral 94 (see Figures 12, 9, 8 and 3). As perhaps best shown in Figure 11, the elbow-like portion 96 has an attaching flange 98 and a substantially semi-circular cradling or adaptor flange 100. The cylinder 60 fits and is rockable in this so-called cradle and the ends of the latter are formed into ring-like bearings 102—102. Exteriorly, these bearings are thickened to provide stop shoulders as at 104—104 (Figs. 9 and 11). Reverting to Figure 8, the flange 80 at the left is rotatable in the adjacent bearing ring 102. At the right in the same figure, the numeral 106 designates a solid shaft which is axially aligned with the "shaft" 78 and extends from the adjacent end head 68 of the cylinder 60. In fact, this shaft also has a flange 108 which abuts and is bolted to the head 68 and is rotatable in the adjacent bearing ring 102. At this point, attention is directed to washers 110 at the left and 112 at the right which embrace the respective flanged ends of the members 78 and 106 and which, as shown in Figure 9, have nose-like stop lugs 114 which engage the coacting stationary stop shoulders to limit the downward swing of the cylinder and bowl assembly and assist in stabilizing the cooperation of the parts. It may be mentioned at this stage that the numerals 116—116 designate appropriate braces which are anchored, as at 118, and have their opposite ends 120 bolted at 122 to the cooperating bearing ring, all as shown in Figures 9, 12, and 3. The bottom flange on the stated fitting, that is the flange 98 (see Figure 8) is bolted to communicatively cooperate with flange means 124 on the cooperating branch of the S-shaped trap 126. The latter has a floor flange 128 (see Figure 3) and a nipple-like extension 130 registering with the waste or soil pipe 132. The numeral 134 is merely a clean-out plug for the trap. It will be evident, therefore, that when the bowl is down as shown in Figure 3, the open end 40 of the discharge neck 38 is in registry with the passage through the fitting or elbow 96 and, hence, when the bowl is flushed the fecal matter is passed on through the trap 126 and into the soil pipe 132 in an obvious manner. Of course, when the bowl is swung up and folded away in the alcove or compartment 26, the head or cylinder 60 oscillates in the adapter and cradling flange 100 and the otherwise open end 40 of the discharge neck is blocked by the adapter flange and substantially closed as shown, for example, in the folded arrangement of Figure 2.

It is desirable to provide satisfactory remote control push-button means for flushing the toilet when the bowl is down but to prevent accidental operation of this flush valve means when the toilet is up as shown in Figure 2. This invites attention, therefore, to a conventional type flush valve 136 shown in Figure 6. The water delivery pipe is at 138 and is suitably connected with the valve 136, and the valve delivers water down through the vertical pipe 88 already briefly mentioned. The usual valve handle is at 140 and it is desirable to so construct the push-button means as to be able to normally retain this handle as is evident from Figure 6. This means comprises a lever 142 which is pivoted at 144, and which has a fork 146 on its lower end with the arms straddling the handle so that when the lever is pushed from right to left in Figure 6 by way of the flush valve push-button 148, the flush valve 136 is operated. It is desirable to provide a safe and sane control for this push button so that, as already stated, it cannot be accidentally operated when the bowl is in its up or folded away position. In order to take care of this, a special arrangement of details is necessary. Reference is had to the details shown in Figure 15, which comprises a substantially rectangular block 150 having a bore in which the cylindrical skirt portion 152 (see Figure 14) is slidable. There is a return spring for the button at 154. The square plunger is denoted at 156 and this is slidable through opening means provided therefor in the block 150. There is a detent accommodating hole 158 in the bottom of the block to accommodate a projectable and retractable detent 160 which as shown in Figure 15 is carried on the upper end of a spring-urged cylinder 162 contained in the housing 164, the spring being denoted at 166. The cooperating vertical latch rod is denoted at 168, whose upper end cooperates with the spring-loaded cylinder 162.

With continued reference to Figure 6, this elongate safety latch rod 168 is suitably mounted, the lower end being shown as slidably mounted in a guide bracket 170. There is an ear or lug 172 which is pivoted to one end of a trip arm 174 which is pivoted at 176. The aforementioned lug 84 is engageable with the intermediate portion of this arm. Normally, the latch rod 168 and trip arm 174 are in an "up" position and the lug 84 is in the position shown in Figure 6 which is the position of parts when the detent is in a position to latch the push-button 148 and to prevent it from being operated while the bowl is in its folded away or up position. When the bowl is down and ready for use, the lug 84 swings around to a position to engage the arm and to pull down on the spring-returned latch rod 168 and to release the detent 160 so that it is then possible to push the button 148 and to operate it for flushing the toilet in use. This is therefore a unique fool-proofing and safety arrangement which prevents a thoughtless user from pushing the button 148 accidentally and flushing the bowl when the bowl is in its out-of-the-way position. On the other hand the structural arrangement is such that the parts do not interfere with pushing the button and flushing the valve 136 in the toilet by way of the pipe 88 and hollow shaft 78 when the toilet is down and in use. It may be stated in this connection that the arm 174 may be of any suitable construction and arrangement and may be mounted in any appropriate way. However, as shown in Figure 5, there is a collar 178 surrounding the water pipe 88 and carrying an outstanding bracket arm 180 on which the trip arm 174 is pivotally mounted at 176 as already explained. The numeral 182 is an appropriate bracing bracket.

As before stated, it is desirable to provide means for automatically lowering the toilet bowl to a position for use and for also mechanically raising it and storing it away when it is not in use. Before discussing this in detail, attention is invited again to Figure 8 and to the shaft 106 which is bolted to the cylinder and which has an end portion operatively mounted in bearing means 184 mounted as at 186 in the wall 188 of the cabinet construction. The extended outer end 190 is provided with a fixedly keyed head 192. Reference is had now to Figure 7, wherein it will be seen that this head has a toothed gear sector 194 thereon meshing with a segmental gear 196 on the arm portion 198 of a crank-like or L-shaped foot pedal. The foot pedal is pivotally mounted at 200 and has an extended arm or toe portion 201 with a foot piece 202 thereon. The gears 194 and 196 are constantly enmeshed with each other. It will be seen that by shoving down on the foot pedal 202 when the latter is in its elevated position as shown, for example, in Figures 3 and 4, the gearing will operate the shaft 106 and turn the cylinder 60 and swing the bowl from its down to its up folded-away position. It is desirable, however, to use this same means for lowering the bowl for use and this is best shown in Figure 7 wherein it will be seen that it comprises a lug or rocker arm 204 on head 192 to which a yoke 206 is pivotally connected, said yoke being on the lower end of a plunger rod 208 which is provided with a leather cup washer 210 and an expansion coil spring 212 and operable in an air cylinder 214. The spring and rod provide a plunger which operates in the cylinder providing a dashpot arrangement to operate on the lug 204 for swinging the head and gear 194 down in a manner to lower the toilet by rotating the shaft 106. The lug 216 on the periphery of the gear serves to accommodate a counterbalanced coil spring 218 mounted on an adjusting hook 220 carried by a support bracket 222. The marginal or peripheral portion of the same gear is provided with a stop shoulder 224 to accommodate the lower end of a trigger or trip rod 226. The latter is slidably mounted in guide brackets 228, has a return spring 230 engaging a cooperating collar 232, said lower end being releasably engageable with the stop shoulder 224 in an obvious manner. The upper end of the rod 226 is pivotally connected at 236 with a suitably shaped trigger lever 238 which is in turn pivotally connected at 240 on the casing. One foot 242 of this lever is in a position to receive the thrust from the plunger 244 which is operated by the push-button 246 in a cylinder 248 provided therefor, said push-button being returned by the action of the coil spring 250 as detailed in Figure 13. Obviously, by pushing on the button 246 against the tension of the spring, the trigger lever 238 is pivoted or operated and this lifts up on the trip rod 226 against the tension of the coil spring 230. This means, therefore, that the lower end of said rod is disengaged from the shoulder 224 and the gear 194 is free to rotate and to turn the shaft 106 in a direction to swing the bowl from its up to its down position. The gear is of course controlled by the operation of the air cylinder. The spring means and the air cylinder serve to oscillate the gear and the spring means 218 is a counterbalance which prevents the parts from operating too rapidly and undesirably. That is to say, by simply pushing the push-button 246, the bowl is automatically lowered from its folded to its ready-to-use position. This same operation acts on the gears 194 and 196 to lift the foot pedal to the elevated position shown in Figs. 3 and 4. After the bowl is used and has been suitably flushed, the user then places his heel or foot on the foot piece 202 and forces the pedal down and this operates the gearing again to operate on the shaft 106 and to lift the bowl up and to swing it again into its accommodation alcove 26. Thus, there is push-button controlled lifting and lowering means on one side of the cabinet structure with the push-button lowering the bowl and the foot pedal raising the bowl. On the other side, there is push-button means for flushing the flush valve 136 and this push-button means is under the influence or control of automatically operable mechanical means including a spring-returned detent which prevents the flush valve push-button from being accidentally operated when the toilet is in its up or folded-away position, as shown, for example, in Figure 2. With further reference to the air cylinder and in respect to Figure 17, the upper end thereof is screw threaded to accommodate a cap 252 having an air regulating port 254 and a needle valve 256. This cap is also provided with outstanding spaced parallel ears 258 to accommodate a hinge 260 which is pivoted therein as at 262 with said hinge fastened on an appropriate supporting angle or equivalent fixedly mounted member 264. These are incidental details but are shown in order to complete the controlling means for the air cylinder. Insofar as this application for patent is concerned, some of these details might be regarded as unnecessary, but they have been shown for completeness of illustration and understanding of the over-all invention. The essential things to be understood are those which have been covered in the objects of the invention set forth in the beginning of the specification and especially in the subjoined claims. This means the structural devices shown, for example, in Figure 8 are especially important; that is, the oscillatable drain type hinge joint between the bowl and the S-trap and the shaft 106 on one side and the tube or pipe 78 on the opposite side with all of the details associated therewith. Novelty is predicated on the construction and arrangement of lifting and lowering mechanism seen in Figure 7. Novelty is particularly directed to the flush valve and safety fool-proofing and latch means shown in Figure 6.

Briefly, in operation it will be understood that when it is desired to use the toilet and, assuming that it is folded away in its compartment, all that is necessary is to push the button 246 and the mechanism in Figure 7 lowers the shaft means and bowl means automatically to its position. The stop 114 engages the stop 104 to limit the downward swing of the bowl and to stabilize it when in horizontal position. As before stated, when through with the bowl the push button 148 is operated to control the flush valve 136 and to flush the bowl. Then, the user steps on the treadle and the bowl is automatically folded up and out of the way. When the bowl goes up and is located in its compartment, the latch rod 168 and detent means 160 (Figure 15) come into play to lock the push-button against accidental operation. It is believed that all of these details have been set forth as the description has gone forward. In the circumstances, it is thought unnecessary to dwell at greater length on the construction, features and advantages and operation.

What is claimed as new is as follows:

1. A fold-away water closet comprising, in combination, a stationary waste disposal conduit, a bowl having a flush water rim and a funneling and discharge neck, a hollow bowl-hinging head having a space therein for receiving and by-passing flush water under pressure, a delivery tube communicatively connecting said head with said rim, said neck being integrated with and passing diametrically through said head between the respective ends of the latter, the effluent end of said neck being open, no portion of said neck actually communicating with the water by-passing space of said head, an elbow-like fitting having communicating connection with said waste conduit and head means, the latter provided with spaced axially aligned bearings, and said hinging head having its end portions journalled for oscillation in said bearings, said hinging head being in the form of a cylinder having an axial water inlet hole at one end, a remote-controlled push-button operated flush valve having a communicable vertical depending flush water conducting pipe provided at its lower end with a valve union, a second horizontal inlet pipe at right angles to said vertical pipe registering at one end with said inlet hole, the other end of said inlet pipe rotating in said union and being closed at the latter end but also provided inwardly of said end with ports selectively communicable with said vertical pipe, the first named end of said horizontal pipe being fixed to, axially aligned with and rotatable with said cylinder.

2. The structure defined in claim 1 and wherein the stated push-button embodies a housing having a safety latch rod opening, a slidably mounted latch rod having a safety detent operable in said rod opening and spring-pressed into the path of operation of said push-button, and an operating connection between said latch rod and inlet pipe whereby, when the bowl is "down" and ready for use, the detent is retracted and said push-button is released and, so long as the bowl is folded away in its "up" position, the detent prevents the push-button from being accidentally operated.

3. The structure defined in claim 2, wherein said operating connection comprises an arm pivotally anchored at one end and pivotally connected at an opposite end to said latch rod, said arm operating in close proximity to an adjacent end of said water inlet pipe and the latter being provided with an eccentrically fixed lug and the latter being engageable with said arm in a manner to cause the latter to operate said latch rod and detent.

4. In a folding toilet, a cabinet having an accommodation compartment, a toilet bowl normally in a folded out-of-the-way "up" position in said compartment, a stationary soil pipe provided at its inlet end with an S-trap, an elbow-like fitting communicatively joined to the intake end of said S-trap and having a semi-cylindrical stationary cylinder-seating and cradling adapter, the latter provided at its respective end with lateral integral ring-like elements functioning as bearings, an oscillatable cylinder confined in said cradling adapter and rockable between said bearings, means journalling the respective end-portions of the cylinder in said bearings, said cylinder providing a flush water receiver, said bowl having an apertured flush ring, a water delivery pipe communicatively connecting said receiver with said ring, said bowl also having a fecal matter emptying neck joined to and operable with said cylinder, said neck being in bowl-scavenging communication with said fitting when the bowl is in its "down" position and out of communication with the fitting when the bowl is in its "up" position, a rocker shaft fixed to and extending axially beyond one end of said cylinder, a spring-rotated gear fixed on said shaft, said gear having a stop shoulder, a pivotally mounted foot treadle having a gear segment meshing with said gear, a remote controlled pushbutton, and a spring-returned trip rod between said push-button and said gear and releasably engageable with said stop shoulder.

5. The structure defined in claim 4, and the combination therewith of a rotary flush water feed pipe fixed to, axially aligned and communicatively connected with the other end of said cylinder, a flush water delivery pipe, an "off" and "on" normally closed selector valve affording an operating flow connection between adjacent cooperating ends of said pipe, a source of water supply embodying a manually tripped flush valve joined to said delivery pipe, said selector valve being "closed" when the bowl is "up" and out of use and "open" when the bowl is "down" and in use.

6. In a folding toilet, a cabinet having a bowl accommodation compartment, a toilet bowl normally in a folded out-of-the-way "up" position in said compartment, a stationary soil pipe provided at its inlet end with an S-trap, an elbow-like fitting communicatively joined to the intake end of said S-trap and having a stationary cylinder-seating and cradling adapter, the latter being substantially semi-circular and provided with integral ring-like members at its respective ends functioning as bearings, an oscillatable bowl hinging, water by-passing cylinder seated in said cradling adapted and rockable between said bearings, means journalling the respective end-portions of the cylinder in said bearings, said bowl having an apertured flush ring, a water delivery pipe communicatively connecting said cylinder with said flush ring, said bowl also having a fecal matter emptying neck joined to and operable simultaneously with said cylinder, said neck being in bowl-scavenging communication with said fitting and S-trap when the bowl is in its "down" position and blocked off by said adapter and substantially out of communication with the fitting when the bowl is in its "up" position, a rotary flush water feed pipe fixed to, axially aligned and communicatively connected with one end of said cylinder, a flush water delivery pipe, and "off" and "on" normally closed selector valve affording an operating flow connection between adjacent cooperating ends of said pipes, a source of water supply embodying a manually tripped flush valve joined to said delivery pipe, said selector valve being closed when the bowl is "up" and out of use and open when the bowl is "down" and in use, a push-button having complementary means for intentionally tripping said flush valve, a reciprocable latch rod having a detent normally engaging said push-button and preventing operation of the same so long as said bowl is "up," and an operating connection between said rotary feed pipe and latch rod.

7. The structure defined in claim 6, wherein said operating connection comprises a lug, eccentrically fixed to one end of said feed pipe, a trigger lever pivotally supported at one end and secured at its opposite end to said latch rod, said lug being engageable with said trigger lever when said bowl is "down," whereby to cause the lever to pull down on the latch rod and to release the detent so that the push button is freely actuatable, but only so long as the bowl is in its "down" usable position.

8. A fold-away water closet comprising, in combination, a stationary waste disposal conduit, a toilet bowl having a complemental flush water rim and a fluid and fecal matter funneling and discharge neck and a hollow bowl-hinging head, water delivery means communicatively connected with said flush rim, said neck being integrated with and passing diametrically through said head between the respective ends of the head, the effluent end of said neck being open, an elbow-like fitting having communicating connection with said waste disposal conduit and provided with spaced axially aligned bearings, and said hinging head having its end portions journalled for oscillation in said bearings, a rigid rocker shaft fixed to and projecting axially from one end of said hinging head for mechanically rotating said head and lifting and lowering said bowl, an air cylinder, a head fixed to said shaft, a spring-biased plunger operable in said cylinder and having a rod pivotally connected with said head, an adjustable counterbalancing spring also connected to said head, said head having a marginal stop shoulder, a remote-controlled spring-returned push-button, a pivotally mounted trigger-lever with which said push-button is releasably engageable, and a slidably mounted head releasing and retaining trip rod, the latter having its upper end pivotally connected with said trigger-lever and its lower end normally but releasably engaging said stop shoulder.

9. The structure in claim 8 and wherein said head has marginal gear teeth, and the combination therewith of a pivotally mounted foot treadle, the latter having a segmental toothed rack whose teeth are in mesh with the teeth of said head.

10. A fold-away water closet comprising, in combination, a stationary waste disposal conduit, a toilet bowl having a complemental flush water rim and a fluid and fecal matter funneling and discharge neck and a hollow bowl-hinging head, water delivery means communicatively connected with said flush rim, said neck being integrated with and passing diametrically through said head between the respective ends of the head, the effluent end of said neck being open, an elbow-like fitting having communicating connection with said waste disposal conduit and provided with spaced axially aligned bearings, and said hinging head having its end portions journalled for oscillation in said bearings, a rigid rocker shaft fixed to and projecting axially from one end of said hinging head for mechanically rotating said head and lifting and lowering said bowl, an air cylinder, a plunger reciprocable in said cylinder and having a rod, means pivotally connecting said rod to said rocker shaft, a coil spring cooperable with said cylinder, plunger and said means, a slidably mounted spring-returned trip rod, manually actuatable remote-controlled means at the upper end of said trip rod for handily releasing the trip rod, and a stop shoulder fixedly carried by said rocker shaft, the lower end of said trip rod being releasably engageable with said shoulder.

11. A fold-away water closet comprising, in combination, a stationary waste disposal conduit, a toilet bowl having a complemental flush water rim, a fluid and fecal matter funneling and discharge neck, and a hollow bowl-hinging head, water delivery means communicatively connected with said flush rim, said neck being integrated with and passing diametrically through said bowl-hinging head between the respective ends of said head, the effluent end of said neck being open, an elbow-like fitting having communicating connection with said waste disposal conduit and provided with spaced axially aligned bearings, and said bowl-hinging head having its end portions journalled for oscillation in said bearings, a rigid rocker shaft fixed to and projecting axially from one end of said bowl-hinging head for mechanically rotating said head and lifting and lowering said bowl, a motion transmitting head fixed to one end of said rocker shaft, and provided with a marginal stop shoulder and also with a radially projecting rocker arm, a pivotally mounted foot treadle having mechanical operating connection with said motion transmitting head and actuatable simultaneously and in combination with said motion transmitting head and rocker shaft, an air cylinder, a plunger reciprocable in said cylinder and having a companion rod pivotally connected with said rocker arm, a coil spring operable in conjunction with said plunger and cylinder, a slidably mounted spring-returned trip rod, the lower end of said trip rod being releasably engageable with said stop shoulder, and manually actuatable remote controlled means operatively arranged at the upper end of said trip rod for handily releasing the trip rod.

12. A fold-away water closet comprising, in combination, a stationary waste disposal conduit, a toilet bowl having a complemental flush water rim and a fluid fecal matter funneling and discharge neck and a hollow bowl-hinging head, water delivery means communicatively connected with said flush rim, said neck being integrated with and passing diametrically through said head between the respective ends of the head, the effluent end of said neck being open, an elbow-like fitting having communicating connection with said waste disposal conduit and provided with spaced axially aligned bearings, and said hinging head having its end portions journalled for oscillation in said bearings, a rigid rocker shaft fixed to and projecting axially from one end of said hinging head for mechanically rotating said head and lifting and lowering said bowl, a pivotally mounted bowl lifting foot treadle, a head fixed to one end of said rocker shaft for imparting prescribed angular rotation thereto, an operating connection between said treadle and head so that by stepping on said treadle when the latter is raised said shaft is rotated in a manner to swingably lift said bowl from its "down" position to its "up" out-of-the-way position, said head having a marginally positioned stop shoulder, a spring returned slidably mounted elongated trip rod having a lower end releasably engaged with said shoulder, and manually actuatable remote controlled means situated at the upper end of said trip rod by way of which the head is released and said shaft is released for free rotation.

13. The structure defined in claim 12 and the combination therewith of a pivotally mounted air cylinder, a spring-biased plunger mounted for reciprocation in said cylinder and including a complemental rod, said head being provided with a radial marginally arranged rocker arm, said rod having a fork pivotally connected to said rocker arm.

14. A fold-away water closet comprising, in combination, a stationary waste disposal conduit, a bowl having a flush water rim and a fluid and fecal matter discharge neck, a hollow cylindrical bowl hinging head, said neck being integral with and passing diametrically through said head between the respective ends of the head, the effluent end of said neck being open, a fitting carried by and communicating with said disposal conduit, said fitting embodying integral head means including axially aligned bearings said hinging head cooperating with said head means and having end portions journalled for oscillation in said bearings, said fitting also embodying imperforate wall portions with which the open end of said neck has cooperating valving association, the forward portion of said flush rim having a multiplicity of water issuing ports communicable with the bowl, the rear portion of said flush rim being imperforate and serving to hold a limited portion of the flush water when the bowl is up so that when the bowl is swung down for use in its regular horizontal position the thus trapped water is gravity-spilled from the rim through said ports and is allowed to flow and pool itself in the bottom of the bowl before the latter is brought into use, and means for delivering flush water under pressure to said flush water rim, and at least one reservoir communicably connected with said flush rim and in which a limited quantity of flush water is temporarily collected and trapped when the bowl is down and flushed and which retains the thus collected water when the bowl is raised to its up position but empties itself into the flush rim when the bowl is next swung and lowered to its down position.

15. The structure defined in claim 14 and wherein said reservoir is essentially in a plane below that of said flush rim and is integrally connected with and freely communicable with said flush rim.

16. In a folding toilet, a cabinet having a bowl accommodation compartment, a toilet bowl normally in a folded out-of-the-way "up" position in said compartment, a stationary soil pipe provided at its inlet end with an S-trap, an elbow-like fitting communicatively joined to the intake end of said S-trap and having a stationary cylinder-seating and cradling adapter, the latter being substantially semi-circular and provided with integral ring-like members at its respective ends functioning as bearings, an osciliatable bowl hinging, water by-passing cylinder seated in said cradling adapter and rockable between said bearings, means journalling the respective end-portions of the cylinder in said bearings, said bowl having an apertured flush ring, a water delivery pipe communicatively connecting said cylinder with said flush ring, said bowl also having a fecal matter emptying neck joined to and operable simultaneously with said cylinder, said neck being in bowl-scavenging, communication with said fitting and S-trap when the bowl is in its "down" position and blocked off by said adapter and substantially out of communication with the fitting when the bowl is in its "up" position, a rocker shaft fixed to and extending axially beyond one end of said cylinder, remote controlled manually actuatable means operatively connected with said shaft for automatically lowering the bowl from its "up" to its "down" position and retaining it in its down position during the period of use, and foot pedal means cooperable therewith and with said shaft and serving, when manually actuated, to positively and mechanically act on the rocker shaft for lifting and swinging the bowl up.

References Cited in the file of this patent
UNITED STATES PATENTS

| 14,902 | Bookhout et al. | May 20, 1856 |
| 1,863,682 | Alberts | June 21, 1932 |
| 2,042,276 | Revers | May 26, 1936 |
| 2,188,562 | Andersen et al. | Jan. 30, 1940 |
| 2,219,437 | Andersen et al. | Oct. 29, 1940 |
| 2,281,265 | Campbell | Apr. 28, 1942 |
| 2,567,025 | Osterhage | Sept. 4, 1951 |